United States Patent [19]

Copelan

[11] 4,214,350
[45] Jul. 29, 1980

[54] ROPE BINDER

[76] Inventor: William L. Copelan, 31843 Tennessee, Yucaipa, Calif. 92399

[21] Appl. No.: 9,749

[22] Filed: Feb. 5, 1979

[51] Int. Cl.² ............................................. F16G 11/10
[52] U.S. Cl. ............................ 24/129 R; 24/68 CD; 24/131 R
[58] Field of Search ............. 24/129 R, 129 C, 131 R, 24/249, 115 R, 68 CD, 68 CT

[56] References Cited
U.S. PATENT DOCUMENTS 332,369   12/1885   Woodworth .................... 24/115 R

FOREIGN PATENT DOCUMENTS 1116274   6/1968   United Kingdom ................. 24/131 R Primary Examiner—Kenneth Downey
Attorney, Agent, or Firm—Harvey S. Hertz

[57] ABSTRACT

A rope binder for use when tension is applied to a rope securing a load to support member. The rope binder is formed of an end base member having an end leg and a central leg. The leg axes extend generally transverse to the axis of the end base member. A generally U-shaped arm is defined by a pair of end posts interconnected by a side post. One of the end posts in integrally connected to one end of the end base and a free end of the other end post is spaced from the central leg enabling a rope to pass intermediate the end post free end and the spaced apart leg.

1 Claim, 4 Drawing Figures

U.S. Patent     Jul. 29, 1980     4,214,350
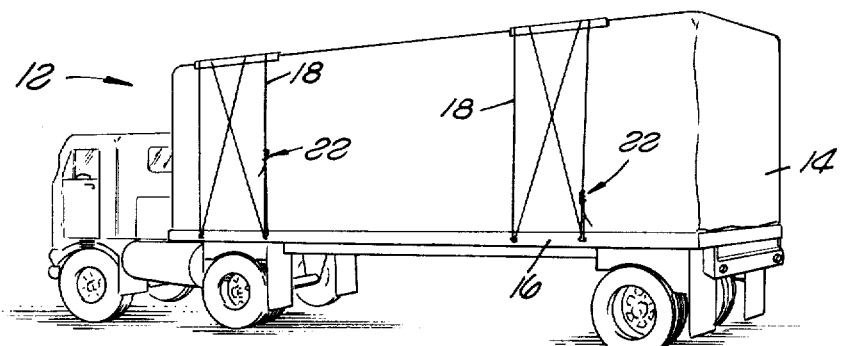
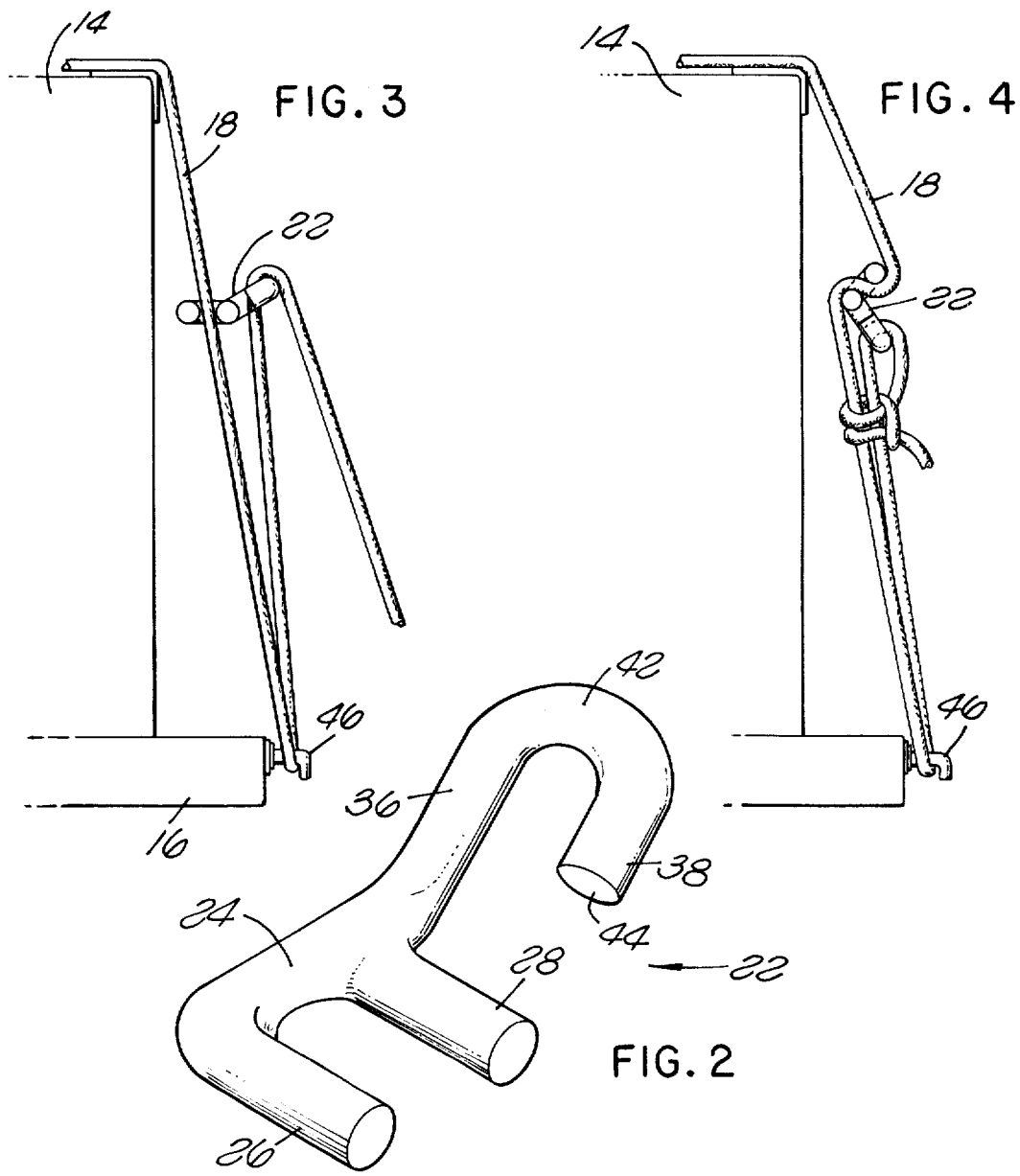

ROPE BINDER

BACKGROUND OF THE INVENTION

(1) Field of the Invention

The field of art to which the invention pertains includes the field of rope securing systems, particularly, with respect to a rope binder for use when applying tension to a rope which is used to secure a load to a support.

(2) Description of the Prior Art

Conventional rope securing systems utilized the rope itself primarily to form an inter-locking knot for securing a load to a support by means of the rope. Such a system is inefficient due to friction loss as tension is applied to the rope. Moreover wear of the rope occurs due to the frictional movement of the rope in the knotted position.

The present invention provides a novel rope binder which can be utilized to provide the desired amount of tension in a rope as it secures a load to a support. Wear and frictional loss of the rope are minimized as the rope binder separates the various portions of the rope as tension is applied thereto.

SUMMARY OF THE INVENTION

A rope binder is utilized when applying tension to a rope while securing a load to a support member. The rope binder is formed of an end base member having an end leg and a central leg, the leg axes extending generally transverse to the axis of the end base. The rope binder further includes a generally U-shaped arm which is defined by a pair of end posts inter-connected by a side post. One of the end posts is integrally connected to one end of the end base and a free end of the other end post is spaced from the central leg for enabling a rope to pass intermediate the end post free end and the spaced apart leg.

The advantages of this invention, both as to its construction and mode of operation, will be readily appreciated as the same becomes better understood by reference to the following detailed description when considered in connection with the accompanying drawings in which like reference numerals designate like parts throughout the figures.

BRIEF DESCRIPTION OF THE DRAWINGS

FIG. 1 is a perspective view of a truck whose load is secured thereto by means of a rope binder constructed in accordance with principles of the invention;

FIG. 2 is a perspective view of the rope binder utilized on the truck of FIG. 1;

FIG. 3 is a partial side view of the truck illustrating the rope binder of FIG. 2 prior to applying tension to the rope; and FIG. 4 is a partial side view of the embodiment of FIG. 3 wherein tension has been applied to the rope.

DESCRIPTION OF THE PREFERRED EMBODIMENT

Referring now to the drawing, there is shown in FIG. 1 a conventional truck-trailer 12 having a load 14 mounted on the trailer bed 16. The load 14 is secured to the trailer bed 16 by means of ropes 18 and utilizes the rope binder 22 made in accordance with principles of the invention. It should be understood, of course, that while the invention illustrates the rope binder being utilized to secure a load to a trailer bed, that the invention could be utilized in any situation where ropes are used to tie a member to a support.

Referring not to FIG. 2, the rope binder 22 is shown in greater detail and includes an end base 24 having an end leg 26 and a central leg 28. The end base 24, the end leg 26 and central leg 28 are integrally formed in a common plane with the axes of the end leg 26 and the central 28 being perpendicular to the axis of the end base. A generally U-shaped arm 34 is formed of a first end post 36 and a second end post 38 which are joined together at one end thereof by means of a side post 42. The first end post 36 is integrally connected to the end base 24 adjacent the central leg 28 and extends at an obtuse angle therefrom. The free end 44 of the second end post 38 is spaced from the central leg 28 a sufficient distance to allow a rope to pass therebetween as will be explained in greater detail hereinafter.

Referring now to FIG. 3, the rope 18 is secured around the load 14, and then fed intermediate the end leg 26 and the central leg 28. Then the rope is positioned around a fixed member such as a L-shaped rope holder 46 secured to a fixed surface such as the truck bed 16. Then the rope is fed through the space defined by the central leg 28 and the second end post free end 44 enabling the rope to be positioned between the first end post 36 and the second end post 38. The rope is then positioned over the side post 42.

When a force is applied to the rope 18 in the direction shown by the arrow in FIG. 3, sufficient tension is applied to the rope so as to enable any slack in the rope to be removed therefrom. During this process the rope 18 movement along the rope binder 22 surfaces minimizes friction. Typically, the rope binder 22 may be made of aluminum or other metal or can be molded from sufficiently hardened plastic material.

Referring now to FIG. 4, when sufficient slack has been removed from the rope 18, the side post 42 of the U-shaped on 34 will normally be moved to the position shown. The rope may be then knotted, otherwise secured as shown in FIG. 4 by securing the rope end around the portions of the rope which have been passed between the end leg 26 and the central leg 28 and the portion of the rope which passes through the end post 36 and 38.

I claim:

1. An integrally formed rope binder for use when applying tension to a rope securing a load comprising:

an end base member having a first end leg and a central leg whose axes extend generally transverse to the axis of the end base member for enabling a rope having a thickness less than the distance between said legs to move at any point between said legs with relative ease; and a generally U-shaped arm defined by a pair of end posts inter-connected by a side post, one of said end posts being integrally connected to one end of said end base and a free end of said other end post being spaced from said central leg for enabling a rope to pass intermediate said end post free end and said central leg, the axis of said end base and the axis of said integrally connected end post intersecting to define an obtuse angle, and whereby said binder is easily removable from said rope.

* * * * *